United States Patent
Kim et al.

(10) Patent No.: US 9,864,914 B2
(45) Date of Patent: Jan. 9, 2018

(54) LENS ASSEMBLY, OBSTACLE DETECTING UNIT USING THE SAME, AND MOVING ROBOT HAVING THE SAME

(71) Applicant: SAMSUNG ELECTRONICS CO., LTD., Suwon-si, Gyeonggi-do (KR)

(72) Inventors: Jong-il Kim, Anyang-si (KR); Suk-june Yoon, Seoul (KR); Shin Kim, Hwaseong-si (KR); Kyung-shik Roh, Seongnam-si (KR); Soon-yong Park, Bucheon-si (KR); Sang-sik Yoon, Yongin-si (KR); Seung-jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 14/883,773

(22) Filed: Oct. 15, 2015

(65) Prior Publication Data
US 2016/0188985 A1   Jun. 30, 2016

(30) Foreign Application Priority Data
Dec. 24, 2014   (KR) .................. 10-2014-0188733

(51) Int. Cl.
*G01C 22/00* (2006.01)
*G06K 9/00* (2006.01)
(Continued)

(52) U.S. Cl.
CPC ............ *G06K 9/00805* (2013.01); *B25J 5/00* (2013.01); *B25J 9/1666* (2013.01);
(Continued)

(58) Field of Classification Search
USPC ...... 701/23, 28, 36, 301; 359/725, 731, 740; 700/245–264; 901/1, 46, 47
See application file for complete search history.

(56) References Cited

U.S. PATENT DOCUMENTS 2,964,997 A * 12/1960 Beernink ............... G02B 13/04
359/725
3,761,158 A * 9/1973 Humphrey ......... G02B 17/0808
359/555
(Continued)

FOREIGN PATENT DOCUMENTS

DE  10 2007 015 552 B3  8/2008
EP        2 631 730 A1    8/2013

OTHER PUBLICATIONS

Extended European Search Report dated Oct. 5, 2016 in corresponding European Patent Application No. 15194782.7.
(Continued)

Primary Examiner — Jonathan L Sample
(74) Attorney, Agent, or Firm — Staas & Halsey LLP

(57) ABSTRACT

An obstacle detecting unit includes a reflective mirror formed to reflect light which is incident from a front area and a lower portion of the front area below a central portion of the reflective mirror; a catadioptric lens disposed coaxially with the reflective mirror in an upper portion of the reflective mirror, the catadioptric lens on which light incident from the front area and an upper portion of the front area; and an image forming module disposed coaxially with the reflective mirror below the reflective mirror, the image forming module on which the light reflected by the reflective mirror is incident, wherein a through hole is formed in the central portion of the reflective mirror, and the light coming out of the catadioptric lens passes through the through hole and then is incident on the image forming module.

9 Claims, 22 Drawing Sheets

(51) Int. Cl.
*G01S 17/93* (2006.01)
*G02B 17/00* (2006.01)
*G02B 17/08* (2006.01)
*G01S 17/46* (2006.01)
*G01S 7/481* (2006.01)
*B25J 5/00* (2006.01)
*B25J 9/16* (2006.01)
*G02B 13/06* (2006.01)
*G05D 1/00* (2006.01)
*G05D 1/02* (2006.01)
*H04N 5/225* (2006.01)

(52) U.S. Cl.
CPC ............ *G01S 7/4816* (2013.01); *G01S 17/46* (2013.01); *G01S 17/936* (2013.01); *G02B 13/06* (2013.01); *G02B 17/00* (2013.01); *G02B 17/08* (2013.01); *G02B 17/086* (2013.01); *G02B 17/0808* (2013.01); *G02B 17/0812* (2013.01); *G05D 1/0088* (2013.01); *G05D 1/0238* (2013.01); *G05D 1/0246* (2013.01); *H04N 5/2254* (2013.01); *A47L 2201/04* (2013.01); *G05D 2201/0203* (2013.01); *Y10S 901/01* (2013.01)

(56) References Cited

U.S. PATENT DOCUMENTS

| | | | |
|---|---|---|---|
| 7,621,638 B2* | 11/2009 | Su | A61B 3/0008 351/221 |
| 9,239,389 B2* | 1/2016 | Jeong | G01S 17/00 |
| 2001/0043321 A1* | 11/2001 | Nishi | G03F 7/70058 355/67 |
| 2002/0044260 A1* | 4/2002 | Takahashi | G02B 13/143 353/31 |
| 2004/0016077 A1* | 1/2004 | Song | A47L 9/009 15/319 |
| 2004/0212715 A1* | 10/2004 | Togino | G02B 17/0848 348/335 |
| 2004/0229133 A1* | 11/2004 | Socha | G03F 1/36 430/5 |
| 2004/0239756 A1* | 12/2004 | Aliaga | G05D 1/0234 348/36 |
| 2005/0142449 A1* | 6/2005 | Shi | G03F 7/705 430/5 |
| 2007/0139174 A1* | 6/2007 | Perkes | B60R 1/12 340/435 |
| 2008/0014509 A1* | 1/2008 | Hsu | G03F 1/36 430/5 |
| 2009/0218478 A1* | 9/2009 | Kim | G01S 7/495 250/221 |
| 2010/0191418 A1* | 7/2010 | Mimeault | B60Q 1/0023 701/36 |
| 2011/0001984 A1* | 1/2011 | Keller | G01N 21/954 356/612 |
| 2013/0208083 A1* | 8/2013 | Li | G03B 37/06 348/36 |
| 2013/0226344 A1* | 8/2013 | Wong | G05D 1/024 700/258 |

OTHER PUBLICATIONS

Partial European Search Report dated Apr. 28, 2016 in European Patent Application No. 15194782.7.

* cited by examiner

LENS ASSEMBLY, OBSTACLE DETECTING UNIT USING THE SAME, AND MOVING ROBOT HAVING THE SAME

CROSS-REFERENCE TO RELATED APPLICATIONS

This application claims priority from Korean Patent Application No. 10-2014-0188733 filed Dec. 24, 2014 in the Korean Intellectual Property Office, the disclosure of which is incorporated herein by reference in its entirety.

BACKGROUND

1. Field

The present disclosure relates to an obstacle detecting unit using a lens that is used for a mobile robot. More particularly, the present disclosure relates to a lens assembly that may be used for an obstacle detecting unit which can detect all of obstacles which are located in a front area, an upper side, and a lower side in front of a mobile robot by using a single image sensor, an obstacle detecting unit using the same, and a mobile robot having the same.

2. Description of the Related Art

A mobile robot, such as a robot cleaner, is configured to move automatically while avoiding obstacles located in front of the mobile robot in order to be able to perform autonomous navigation and certain tasks.

For this, the mobile robot is provided with an obstacle detecting unit. Conventional robot cleaners are provided with a number of position sensitive detectors (PSD) that are a position detecting sensor and are disposed in the front and at the top of the mobile robot as the obstacle detecting sensor in order to avoid obstacles. However, this method has problems that the blind spot of the obstacle detection cannot be completely eliminated, and the material cost is increased because it uses a plurality of sensors.

For solving these problems, a robot cleaner has been developed to detect obstacles in front of the robot cleaner using an omni-directional camera system. However, because the conventional omni-directional camera system is configured to detect either obstacles in the front area and an upper side of the front area or obstacles in the front area and the lower side of the front area, there is a problem in that it cannot detect the upper and lower sides of the front area at the same time.

For solving this problem, the use of two omni-directional camera systems one of which can detect obstacles in the upper side of the front area and the other of which can detect obstacles in the lower side of the front area may be considered. However, because this configuration uses two camera systems, there is a problem in that the material cost is increased, and to increase the data processing capability of a controller is also required because the amount of data to be processed is increased.

SUMMARY

The present disclosure has been developed in order to overcome the above drawbacks and other problems associated with the conventional arrangement. An aspect of the present disclosure relates to a lens assembly that may be used for an obstacle detecting unit capable of detecting obstacles which are located in a front area, an upper side of the front area, and a lower side of the front area using a single image sensor, an obstacle detecting unit using the same lens assembly, and a mobile robot having the same.

The above aspect and/or other feature of the present disclosure can substantially be achieved by providing a lens assembly, which may include a reflective mirror formed to reflect light which is incident from a front area and a lower side of the front area below a central portion of the reflective mirror; and a catadioptric lens disposed coaxially with the reflective mirror in an upper side of the reflective mirror, the catadioptric lens on which light incident from the front area and an upper side of the front area, wherein a through hole through which the light coming out of the catadioptric lens passes is formed in the central portion of the reflective mirror.

The catadioptric lens may be detachably disposed in the reflective mirror.

The catadioptric lens may include a first surface and a second surface facing each other, the first surface includes a reflecting area formed on an inside of the first surface and a refracting area surrounding the reflecting area, and the second surface includes a refracting area and a reflecting area surrounding the refracting area.

The refracting area of the first surface of the catadioptric lens may be formed to receive outside light, the reflecting area of the second surface of the catadioptric lens may be formed to reflect the light incident on the refracting area of the first surface to the reflecting area of the first surface, and the refracting area of the second surface may be formed to transmit the light reflected by the reflecting area of the first surface so that the light is emitted to an outside of the catadioptric lens.

The refracting area of the first surface may be formed so that light having an incident angle of 0 to 60 degrees is incident.

The lens assembly may include a masking to limit the incident angle formed on the first surface.

The reflecting area of the first surface and the reflecting area of the second surface may be formed of any one of aluminum and chrome.

The reflective mirror may be formed to reflect light having an incident angle of −60 to 0 degrees below the through hole of the reflective mirror.

The through hole of the reflective mirror may be formed not to interfere with the light emitted from the catadioptric lens.

According to another aspect of the present disclosure, an obstacle detecting unit may include a reflective mirror formed to reflect light which is incident from a front area and a lower side of the front area below a central portion of the reflective mirror; a catadioptric lens disposed coaxially with the reflective mirror in an upper side of the reflective mirror, the catadioptric lens on which light incident from the front area and an upper side of the front area; and an image forming module disposed coaxially with the reflective mirror below the reflective mirror, the image forming module on which the light reflected by the reflective mirror is incident, wherein a through hole is formed in the central portion of the reflective mirror, and the light coming out of the catadioptric lens passes through the through hole and then is incident on the image forming module.

The catadioptric lens may be detachably disposed in the reflective mirror.

The catadioptric lens may include a first surface and a second surface facing each other, the first surface may include a reflecting area formed on an inside of the first surface and a refracting area surrounding the reflecting area, and the second surface may include a refracting area and a reflecting area surrounding the refracting area.

The refracting area of the first surface of the catadioptric lens may be formed to receive outside light, the reflecting area of the second surface of the catadioptric lens may be formed to reflect the light incident on the refracting area of the first surface to the reflecting area of the first surface, and the refracting area of the second surface may be formed to transmit the light reflected by the reflecting area of the first surface so that the light is emitted to an outside of the catadioptric lens.

The obstacle detecting unit may include a transparent support member fixing the reflective mirror and the image forming module.

The image forming module may include an image sensor, and wherein the light incident on the catadioptric lens is incident on a first area in a central portion of the image sensor, thereby forming an upper image, and the light reflected by the reflective mirror is incident on a second area of the image sensor surrounding the first area, thereby forming a lower image.

According to another aspect of the present disclosure, a mobile robot may include a main body of the mobile robot; a driving unit disposed in the main body to move the mobile robot; an obstacle detecting unit disposed in a front side of the main body to detect obstacles which are located at a front area, a lower side of the front area, and an upper side of the front area in front of the mobile robot; and a controller configured to control the driving unit according to obstacle information received from the obstacle detecting unit, thereby moving the mobile robot.

The reflective mirror may be formed to reflect the light incident within a range of about 120 degrees in left and right of a straight line which is parallel to the forward and backward directions of the main body and passes through a center of the reflective mirror to the image forming module, and a portion of the reflective mirror which does not reflect the light is fixed to the main body.

The obstacle detecting unit may be formed to recognize an object within a predetermined distance in a vertical direction from the catadioptric lens as an obstacle, and not to recognize an object which is located at a distance greater than the predetermined distance as the obstacle.

The mobile robot may include a light emitting module which is disposed in the main body of the mobile robot and projects light forward, wherein the obstacle detecting unit detects the obstacles which are located at the front area, the lower side of the front area, and the upper side of the front area using the light projected from the light emitting module.

The light emitting module may include an upper light emitting module to project the light toward the upper side of the front area; and a lower light emitting module to project the light toward the lower side of the front area.

The above aspect and/or other feature of the present disclosure can substantially be achieved by providing an obstacle detecting unit configured to be installed in a robot cleaner. The obstacle detecting unit may include an image forming sensor to form an image by collecting incident light, a catadioptric lens to direct light received from an upper frontal area to the image forming sensor, and a reflective mirror to reflect light received from a lower frontal area to the image forming sensor.

The above aspect and/or other feature of the present disclosure can substantially be achieved by providing an obstacle detecting unit configured to be installed in a robot cleaner. The obstacle detecting unit may include a first light emitter to project light toward a first area disposed above the first light emitter, a second light emitter to project light toward a second area disposed below the second light emitter, an image forming sensor to form an image by collecting incident light, a catadioptric lens to direct light received from the first area disposed above the first light emitter to the image forming sensor, and a reflective mirror to reflect light received from the second area disposed below the second light emitter to the image forming sensor.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Figure 1:
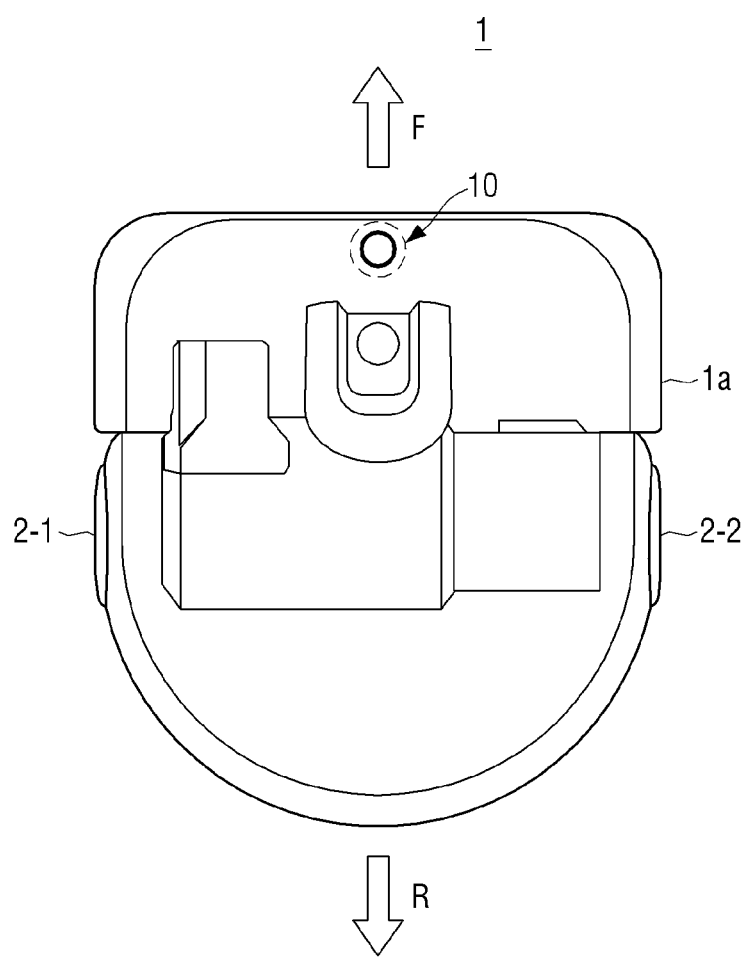
FIG. 1 is a plan view illustrating a robot cleaner having an obstacle detecting unit according to an exemplary embodiment of the present disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail. Further, dimensions of various elements in the accompanying drawings may be arbitrarily increased or decreased for assisting in a comprehensive understanding.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

Hereinafter, certain exemplary embodiments of the present disclosure will be described in detail with reference to the accompanying drawings.

The present disclosure relates to an obstacle detecting unit that can detect obstacles existing around a mobile robot so as to allow the mobile robot to autonomously move. The obstacle detecting unit according to the present disclosure may be applied to various types of mobile robots, such as robot cleaners, guard robots, etc.

Hereinafter, a robot cleaner will be described as an example of the mobile robot to which the present disclosure is applied. However, the present disclosure is not limited to the robot cleaner, and may be applied to various types of mobile robots capable of autonomous navigation.

FIG. 1 is a plan view illustrating a robot cleaner having an obstacle detecting unit according to an exemplary embodiment of the present disclosure.

A robot cleaner 1 is an apparatus that can clean a cleaning area automatically by sucking dirt, such as dust, etc., from a surface to be cleaned while autonomously moving in the cleaning area without manipulation of a user. The robot cleaner 1 detects obstacles, such as walls, furniture, etc., that are located in the cleaning area by using a variety of sensors built into the robot cleaner 1, and controls the traveling route and the cleaning operation of the robot cleaner 1 by using the detection result.

Particularly, the robot cleaner 1 may project a planar light while moving in the cleaning area and may detect obstacles that exist where the planar light is projected. Here, the planar light may refer to a thin light that is emitted from a light source and travels in various directions in a single plane.

An obstacle detecting unit 10 provided in the robot cleaner 1 may be formed to detect whether obstacles exist in the entire periphery of the robot cleaner 1 or in a wide area of the fan shape. Also, the robot cleaner 1 may determine a distance to the obstacle, a position of the obstacle, a height of the obstacle, a shape of the obstacle, a falling point, etc. on the basis of the detection result of the obstacle detecting unit 10. On the basis of the information regarding the obstacle, the robot cleaner 1 may determine the cleaning area, and may perform cleaning while autonomously moving.

Figure 2:
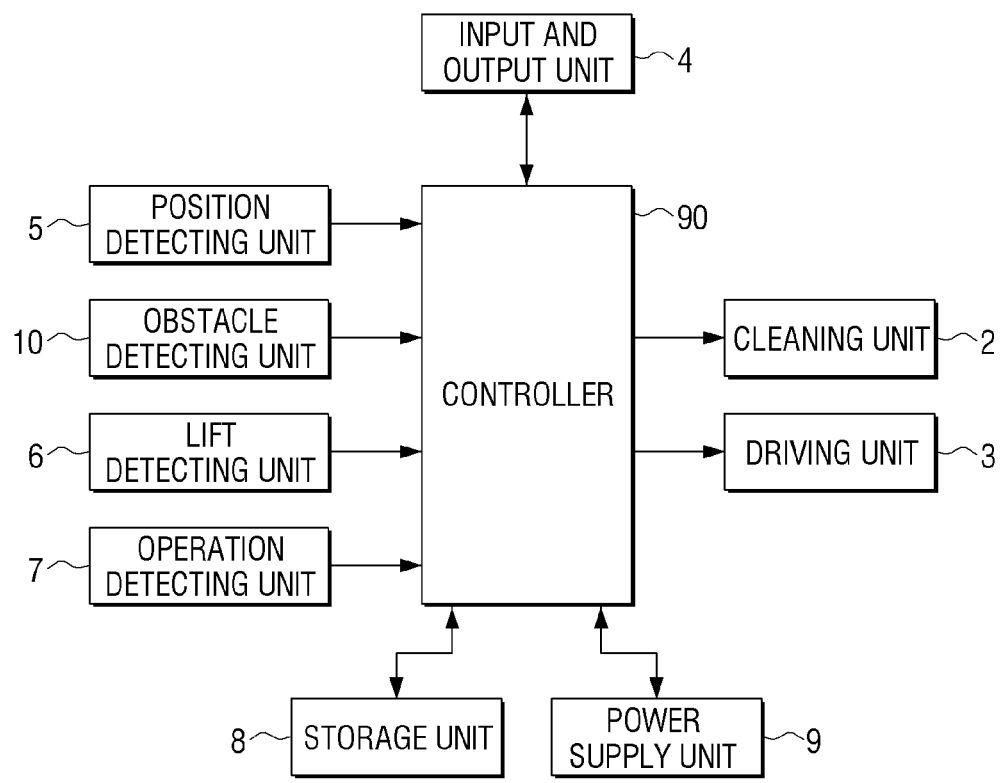
FIG. 2 is a functional block diagram of a robot cleaner having an obstacle detecting unit according to an exemplary embodiment of the present disclosure.
Figure 3:
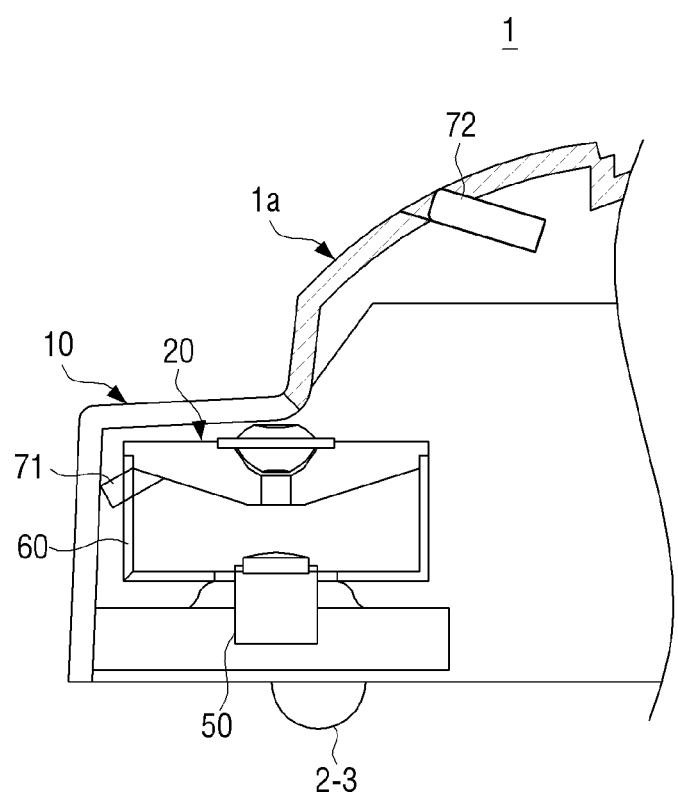
FIG. 3 is a partial view illustrating an obstacle detecting unit according to an exemplary embodiment of the present disclosure that is disposed in a robot cleaner.

FIG. 2 is a functional block diagram of a robot cleaner having an obstacle detecting unit according to an exemplary embodiment of the present disclosure. FIG. 3 is a partial view illustrating an obstacle detecting unit according to an exemplary embodiment of the present disclosure that is disposed in a robot cleaner.

Referring to FIGS. 1 to 3, the robot cleaner 1 may include a main body 1a forming an appearance of the robot cleaner 1, a cleaning unit 2, a driving unit 3, an input and output unit 4, a position detecting unit 5, an obstacle detecting unit 10, a lift detecting unit 6, an operation detecting unit 7, a storage unit 8, a power supply unit 9, and a controller 90.

The cleaning unit 2 is disposed in the bottom surface of the main body 1a, and may include a brush (not illustrated) to direct or sweep dirt, such as dust, existing in the cleaning area to a suction port (not illustrated). The cleaning unit 2 may include a suction force generating apparatus (not illustrated) for generating a suction force to act on the suction port and a dust collecting apparatus (not illustrated) for separating and storing the sucked dirt.

The driving unit 3 may include a pair of driving wheels 2-1 and 2-2 to drive the robot cleaner 1 depending on a driving control signal and an auxiliary wheel 2-3 that is rotated according to a moving direction of the robot cleaner 1 and supports the main body 1a so that the main body 1a keeps a stable posture. The driving wheels 2-1 and 2-2 and the auxiliary wheel 2-3 are disposed on the bottom surface of the main body 1a. The controller 90 may control the pair of driving wheels 2-1 and 2-2 so that the robot cleaner 1 performs moving operations, such as a forward moving operation, a backward moving operation, a rotating operation, etc., to clean.

The input and output unit 4 is provided on a top surface of the main body 1a of the robot cleaner 1, and may include an input member (not illustrated) that can receive user's commands regarding the operation of the robot cleaner 1 and a display member (not illustrated) that can indicate information with respect to the operation of the robot cleaner 1. Buttons, a touch screen, etc. may be used as the input member. Also, a liquid crystal display (LCD) panel, a light emitting diode (LED) panel, etc. may be used as the display member.

The position detecting unit 5 may include an upward camera module (not illustrated) for acquiring an image above the robot cleaner 1, that is, an image of a ceiling of the area where the robot cleaner 1 is located. For example, when the robot cleaner 1 is moving in an arbitrary direction without a defined path, the position detecting unit 5 may detect a current position of the robot cleaner 1 by taking an upward image of the robot cleaner 1 through the upward camera module. The controller 90 may control the movement of the robot cleaner 1 by using the current position information detected by the position detecting unit 5.

The obstacle detecting unit 10 may be configured to detect obstacles which are located in a front area, an upper side or portion of the front area, and a lower side or portion of the front area in front of the robot cleaner 1. Here, the front area of the robot cleaner 1 refers to a space in front of the robot cleaner. Also, in an embodiment, an upper side or upper portion of the front area includes an area in front of and above the robot cleaner 1 and a lower side or lower portion of the front area includes an area in front of and below the robot cleaner 1. The obstacle detecting unit 10, as illustrated in FIG. 1, is disposed in the front side in the moving direction F of the robot cleaner 1, that is, in the front side of the main body 1a. The obstacle detecting unit 10 is configured to be able to detect an obstacle by detecting a reflected light that is emitted from light emitting modules 71 and 72 provided in the robot cleaner 1 and then reflected on the obstacle. The obstacle detecting unit 10 will be described in more detail later.

The lift detecting unit 6 is configured to detect when the driving wheels 2-1 and 2-2 are not in contact with the bottom surface of the cleaning area. A release sensor may be used as the lift detecting unit 6. In detail, when the robot cleaner 1 falls or is lifted up so as to be separated from the bottom surface of the cleaning area, the driving wheels 2-1 and 2-2 become deviated from an original position thereof, and then the release sensor is formed to detect the deviation of the driving wheels 2-1 and 2-2.

The operation detecting unit 7 may include an acceleration sensor (not illustrated), a gyro sensor (not illustrated), etc. for detecting translation movement and rotation of the robot cleaner 1, and generate driving information of the robot cleaner 1. The light emitting modules 71 and 72 of the obstacle detecting unit 10 may operate on the basis of the driving information. For example, when receiving a driving signal from the operation detecting unit 7, the light emitting modules 71 and 72 may turn on a light source, and when receiving a stop signal from the operation detecting unit 7, the light emitting modules 71 and 72 may turn off the light source.

The storage unit 8 may include a nonvolatile memory (not illustrated), such as a magnetic disc, a solid state disc, etc., that permanently stores programs and control data for controlling the operation of the robot cleaner 1, and a volatile memory (not illustrated), such as a D-RAM, a S-RAM, etc., that stores temporary data generated when controlling the operation of the robot cleaner 1.

The power supply unit 9 is configured to supply power such as driving power to each of components of the robot cleaner 1. The power supply unit 9, for example, may use a rechargeable battery that can be recharged. At this time, when the robot cleaner 1 completes the cleaning work and locates at a docking station, the power supply unit 9 may be formed to receive power from the docking station to be charged.

The controller 90 may be configured to control the operation of the robot cleaner 1 on the basis of the detection result of the obstacle detecting unit 10 of the robot cleaner 1. For example, the controller 90 may define a moving route on the basis of the obstacle detection information, that is, on the basis of information about the surrounding environment of the robot cleaner 1, and may generate control signals for controlling the moving or the cleaning operation of the robot cleaner 1 according to the defined moving route.

At this time, the obstacle detection information may include a distance between the main body 1a and an obstacle, a position of the obstacle, a height of the obstacle, a shape of the obstacle, a falling point, etc., and may be received from the obstacle detecting unit 10 or generated directly by the controller 90.

Hereinafter, the obstacle detecting unit 10 disposed in the robot cleaner 1 will be described in detail with reference to FIGS. 3 through 6.

Figure 4:
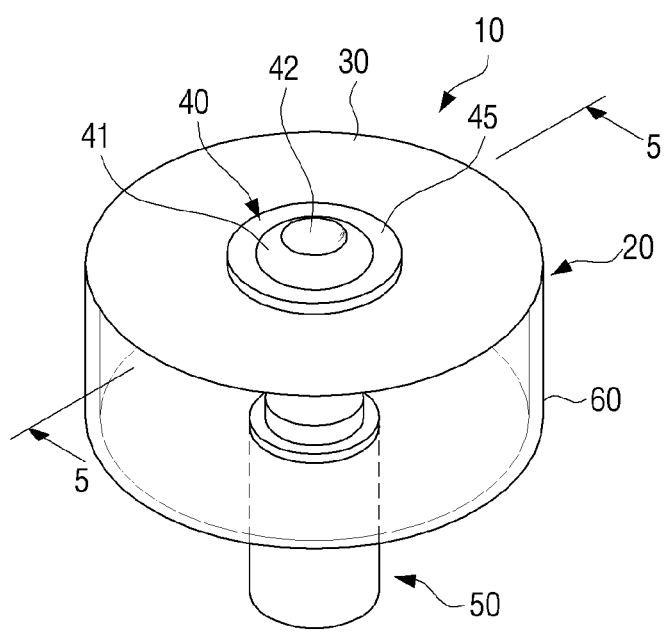
FIG. 4 is a perspective view illustrating a lens assembly and an image forming module of the obstacle detecting unit of FIG. 3.
Figure 5:
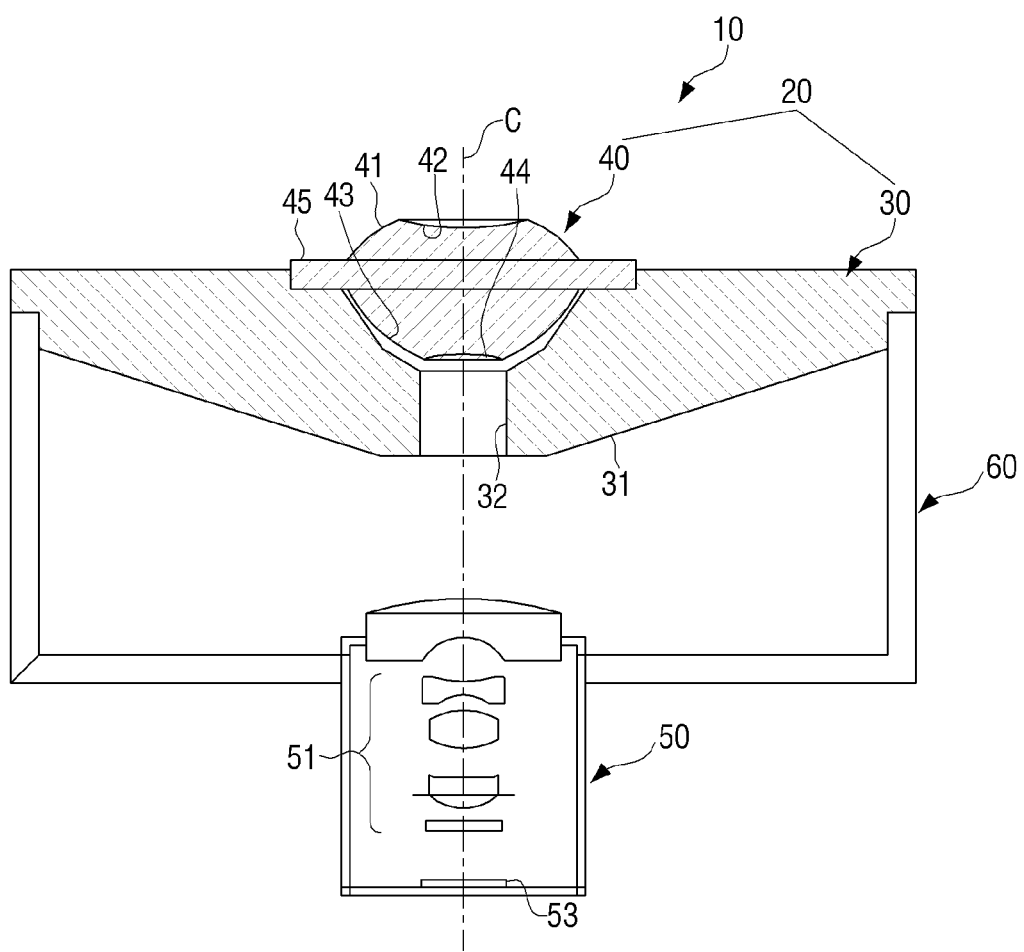
FIG. 5 is a cross-sectional view illustrating the obstacle detecting unit of FIG. 3 taken along a line 5-5 in FIG. 4.
Figure 6:
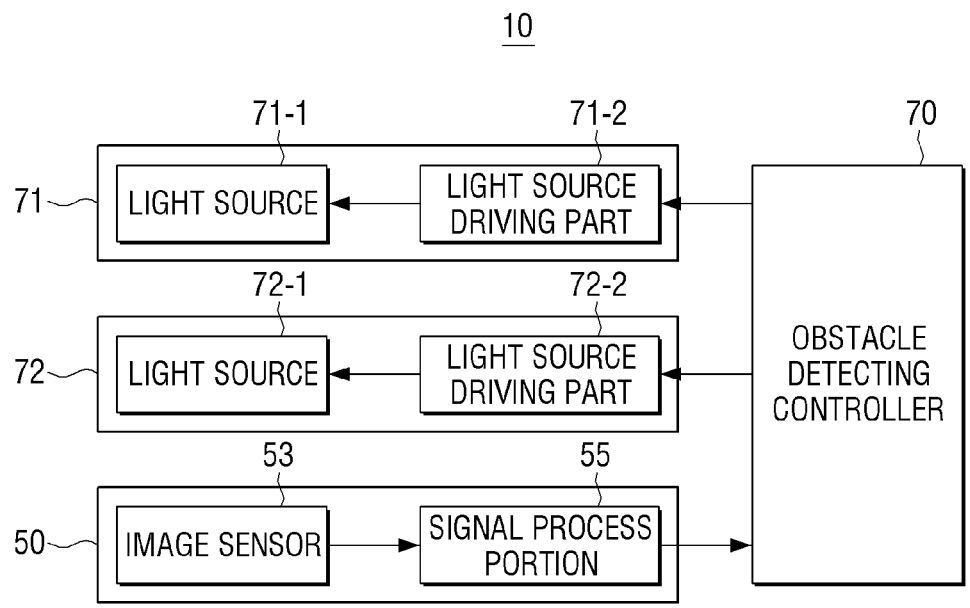
FIG. 6 is a functional block diagram of an obstacle detecting unit according to an exemplary embodiment of the present disclosure.

FIG. 3 is a partial view illustrating an obstacle detecting unit according to an exemplary embodiment of the present disclosure that is disposed in a robot cleaner. FIG. 4 is a perspective view illustrating a lens assembly to be used for the obstacle detecting unit of FIG. 3, and FIG. 5 is a cross-sectional view illustrating the lens assembly of FIG. 4 taken along a line 5-5 in FIG. 4. FIG. 6 is a functional block diagram of an obstacle detecting unit according to an exemplary embodiment of the present disclosure.

Referring to FIG. 3, the obstacle detecting unit 10 according to an exemplary embodiment of the present disclosure may include, for example, a lens assembly 20, light emitting modules 71 and 72, and an image forming module 50.

The lens assembly 20 may be formed to receive light incident from an angle range between about 60 degrees upward from the horizontal plane and about 60 degrees downward from the horizontal plane and to change the optical path 20, namely, a range of −60 degrees to +60 degrees, and change an optical route of the light. Referring to FIGS. 4 and 5, the lens assembly 20 may include a reflective mirror 30 and a catadioptric lens 40.

The reflective mirror 30 is formed to reflect light incident from the front area and the lower side of the front area, for example, an angle range of −60 to 0 degrees below a central portion of the reflective mirror 30. The image forming module 50 is disposed below the central portion of the reflective mirror 30 so that the light reflected by the reflective mirror 30 is incident on the image forming module 50.

Figure 7:
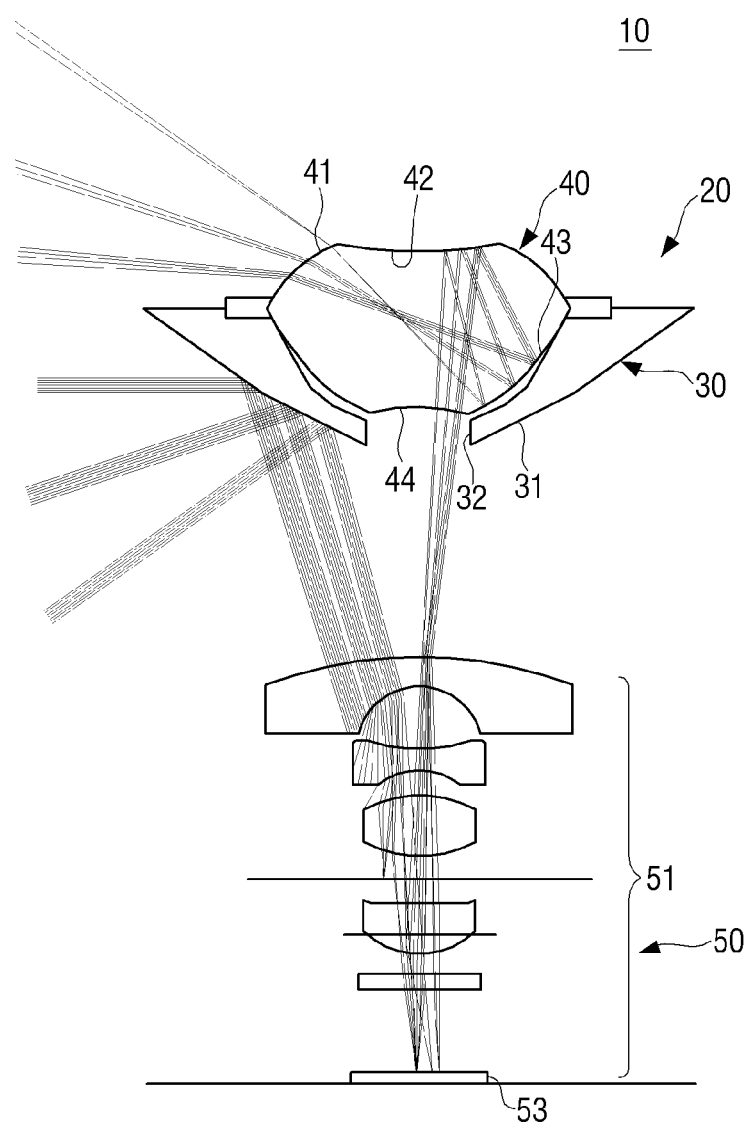
FIG. 7 is a cross-sectional view illustrating a path of light incoming to an obstacle detecting unit according to an exemplary embodiment of the present disclosure.

In detail, in this exemplary embodiment, as illustrated in FIG. 7, the reflective mirror 30 is formed to reflect the light having an incident angle of −40 to 0 degrees toward the image forming module 50 that is disposed below the central portion of the reflective mirror 30. For example, the reflective mirror 30 is formed in a substantially truncated cone, and has a reflecting surface 31 formed on a bottom surface of the truncated cone and a through hole 32 formed in the central portion of the truncated cone. The through hole 32 may be formed so that the light coming out of the catadioptric lens 40 is not blocked by the through hole 32 and is incident on the image forming module 50. The reflective mirror 30 may be made of aluminum so as to reflect the incident light from the outside without distortion. Alternatively, in order to reflect the incident light without distortion, the reflective mirror 30 may be formed in a truncated cone made of plastic, and the reflecting surface 31 may be formed by chrome plating the bottom surface of the truncated cone.

In FIG. 5, the cross-section of the reflecting surface 31 of the reflective mirror 30 is a straight line. However, the cross-section of the reflecting surface 31 of the reflective mirror 30 may be formed as a curved line as long as it can allow the light entering from the front area and the lower side of the front area to be incident on the image forming module 50 that is located below the central portion of the reflective mirror 30, namely, below the through hole 32. For example, the cross-section of the reflecting surface 31 of the reflective mirror 30 may be formed in a convex curved line.

Figure 8:
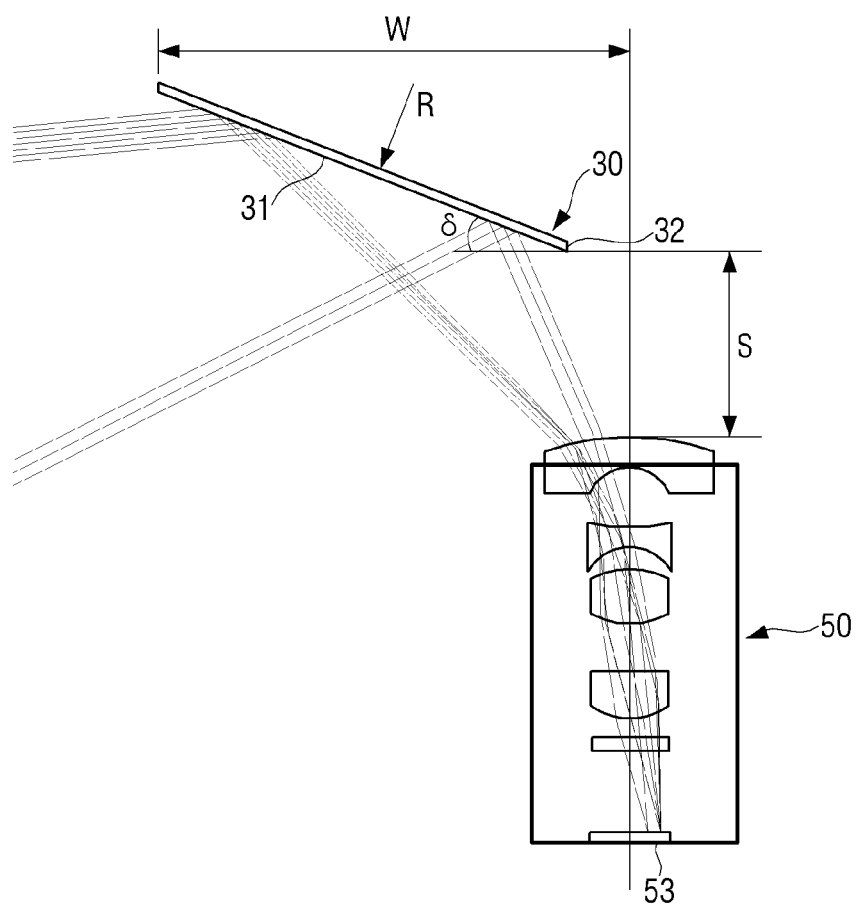
FIG. 8 is a view for explaining design conditions of a reflective mirror that is used in an obstacle detecting unit according to an exemplary embodiment of the present disclosure.

Hereinafter, design conditions of the reflective mirror 30 will be described in detail referring to FIG. 8. FIG. 8 is a view for explaining the design conditions of a reflective mirror 30 that is used in an obstacle detecting unit 10 according to an exemplary embodiment of the present disclosure.

The reflective mirror 30 may be formed to avoid distortion of the image without damaging the resolution of the image forming module 50. As illustrated in FIG. 8, the reflective mirror 30 may be determined by an inclined angle δ of the reflecting surface 31, a curvature R of the reflecting surface 31, and a distance W from a center of the reflective mirror 30 to the edge of the reflective mirror 30. The reflective mirror 30 may be designed to reflect the light, which enters with a certain angle downward with respect to the horizontal plane, in the present embodiment, an incident angle range of −40 to 0 degrees, to the image forming module 50. If the inclined angle δ of the reflective mirror 30 is reduced while maintaining the incident angle constant, the curvature R of the reflecting surface 31 is increased, the distance W to the edge of the reflective mirror 30 is increased, and the incident angle of the light incident on the image forming module 50 is increased. Also, the incident position of the image sensor 53 is increased. However, because the size of the image sensor 53 is limited, increasing the curvature R of the reflective mirror 30 is limited.

Additionally, if the inclined angle δ of the reflective mirror 30 is increased while maintaining the incident angle constant, the curvature R of the reflecting surface 31 is decreased, the distance W to the edge of the reflective mirror 30 is decreased, and the incident angle of the light incident to the image forming module 50 is decreased. Also, the incident position of the image sensor 53 is decreased.

Accordingly, the reflective mirror 30 according to the present embodiment may have the inclined angle δ of a range of 10 to 45 degrees, and the curvature R of the reflecting surface 31 of at least ±50. Preferably, the inclined angle δ of the reflective mirror 30 may be a range of 15 to 20, and the curvature R of the reflecting surface 31 may be a range of ±150 to ±350. Also, the distance W from the center of the reflective mirror 30 to the edge of the reflective mirror 30 and a gap S between the bottom end of the reflective mirror 30 and a top end of the image forming module 50 may be determined so that, when the inclined angle δ of the reflective mirror 30 and the curvature R of the reflecting surface 31 are within the above-described range, the light entering from the full range of the front detecting area will be incident on the image forming module 50.

The catadioptric lens 40 may be disposed coaxially with the reflective mirror 30 in the upper side of the reflective mirror 30, and may be formed so that light from the front area and the upper side of the front area is incident on the catadioptric lens 40. The catadioptric lens 40 changes the path of the incident light so that the incident light is incident on the image forming module 50 through the through hole 32 of the reflective mirror 30.

Figure 9:
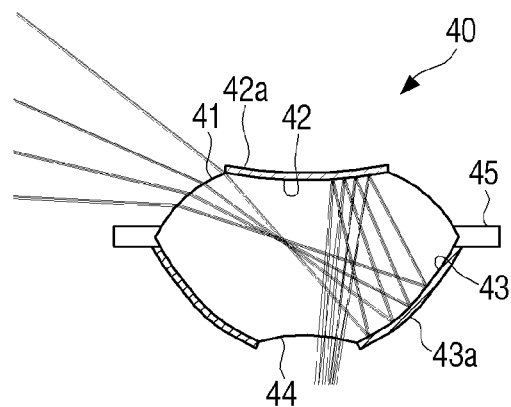
FIG. 9 is a cross-sectional view illustrating a catadioptric lens of a lens assembly that is used in an obstacle detecting unit according to an exemplary embodiment of the present disclosure.

FIG. 9 is a cross-sectional view illustrating a catadioptric lens 40 of a lens assembly 20 that is used in an obstacle detecting unit 10 according to an exemplary embodiment of the present disclosure.

Referring to FIG. 9, the catadioptric lens 40 includes a first surface 41 and 42 and a second surface 43 and 44 facing each other. The first surface 41 and 42 is located at the upper side of the catadioptric lens 40, and the outside light is incident on the first surface 41 and 42. The second surface 43 and 44 is located below the first surface 41 and 42, and emits the light, which is incident on the first surface 41 and 42, toward the outside. The first surface 41 and 42 may include a reflecting area 42 that is formed in the centric portion of the inner side of the first surface and a refracting area 41 surrounding the reflecting area 42. The refracting area 41 of the first surface is formed so that the outside light is incident on the refracting area 41. At this time, the refracting area 41 of the first surface may be formed so that the light having an incident angle of the horizontal plane to 60 degrees upwardly from the horizontal plane, namely, an angle range of 0 to 60 degrees is incident on the refracting area 41.

In an exemplary embodiment as illustrated in FIG. 7, the refracting area 41 of the first surface is formed so that the light having the incident angle of an angle range of 0 to 40 degrees can be incident on the refracting area 41. Also, the refracting area 41 of the first surface refracts the incident outside light to the reflecting area 43 of the second surface. The second surface 43 and 44 may include a refracting area 44 that is formed in the centric portion of the inner side of the second surface and a reflecting area 43 surrounding the refracting area 44. The reflecting area 43 of the second surface reflects the light incident on the refracting area 41 of the first surface to the reflecting area 42 of the first surface. The reflecting area 42 of the first surface reflects the incident light to the refracting area 44 of the second surface. The refracting area 44 of the second surface may function as an exit for discharging the light that is reflected by the reflecting area 42 of the first surface and is incident on the refracting area 44 to the outside of the catadioptric lens 40. Also, the refracting area 44 of the second surface refracts the incident light so that the incident light passes through the through hole 32 of the reflective mirror 30 and is incident on the image forming module 50. The reflecting area 42 of the first surface and reflecting area 43 of the second surface may be coated to reflect the incident light without distortion. For example, the reflecting areas 42 and 43 of the first and second surfaces may include reflection coating layers 42a and 43a formed by aluminum coating, chromium coating, etc.

The catadioptric lens 40 may be formed in a single body with the reflective mirror 30 or may be disposed detachably in the reflective mirror 30. In the present embodiment, a supporting portion 45 may be provided in the outer periphery of a boundary between the first surface and the second surface of the catadioptric lens 40 so that the catadioptric lens 40 is connected to the reflective mirror 30. If the catadioptric lens 40 and the reflective mirror 30 are formed detachably from each other, either the catadioptric lens 40 or the reflective mirror 30 the specification of which is changed in accordance with the change in the obstacle detecting range may be newly made and used. Therefore, utilization thereof may be increased.

The lens assembly 20 may be fixed to the main body 1a of the robot cleaner 1 in a variety of ways. FIG. 3 illustrates a case in which the lens assembly 20 is fixed to the main body 1a of the robot cleaner 1 by a transparent support member 60. As illustrated in FIGS. 4 and 5, the transparent support member 60 is formed to be able to support the edge of the reflective mirror 30 of the truncated conical shape. The image forming module 50 is disposed in the bottom side of the transparent support member 60. At this time, the image forming module 50 is disposed in the transparent support member 60 so as to be positioned coaxially with the center axis C of the reflective mirror 30 and the catadioptric lens 40. Accordingly, the catadioptric lens 40, the reflective mirror 30, and the image forming module 50 are positioned on the same axis. The transparent support member 60 is formed of a transparent material so that it does not block the light from the front area and the lower side of the front area from being incident to the reflective mirror 30.

In the above description, the lens assembly 20 is fixed to the robot cleaner 1 by the transparent support member 60. However, the method for supporting the lens assembly 20 is not limited thereto. The lens assembly 20 may be directly fixed to the main body 1a of the robot cleaner 1.

Figure 10A:
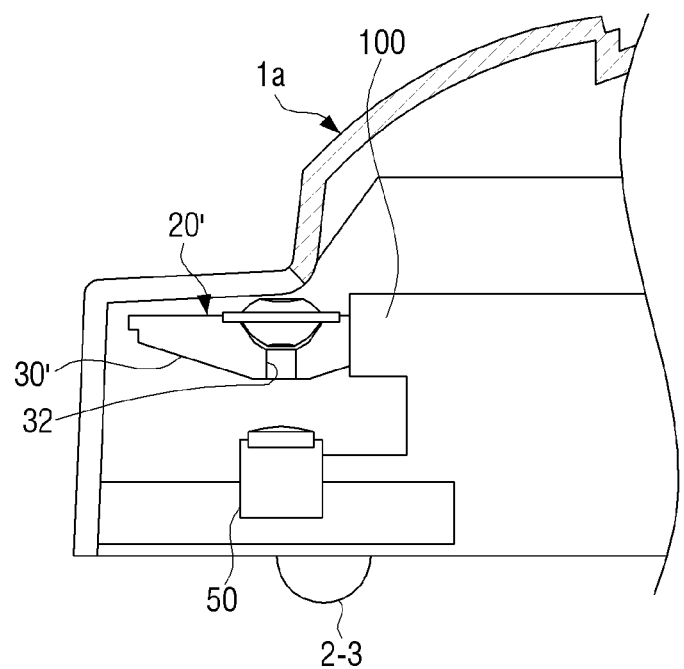
FIG. 10A is a partial cutaway view illustrating a case in which a rear side of a lens assembly used in an obstacle detecting unit according to an exemplary embodiment of the present disclosure is directly fixed to a main body of a robot cleaner.
Figure 10B:
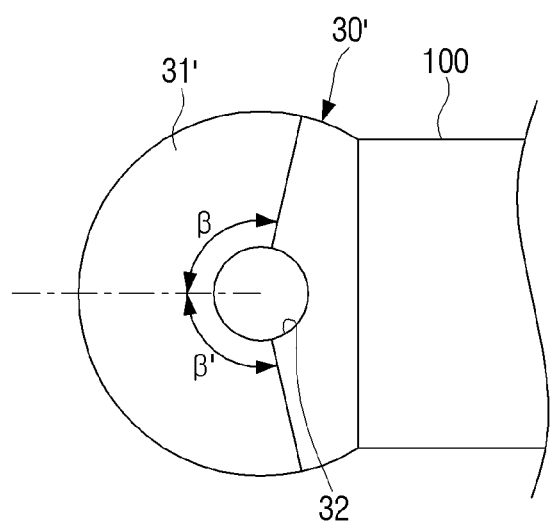
FIG. 10B is a bottom view of the lens assembly of FIG. 10A.

FIG. 10A is a view illustrating a case in which a lens assembly is directly fixed to a main body of a robot cleaner, and FIG. 10B is a bottom view of the lens assembly of FIG. 10A.

Referring to FIGS. 10A and 10B, a rear side of the lens assembly 20' is fixed to the main body 1a of the robot cleaner 1 by a fixing bracket 100. In this case, the reflective mirror 30' does not need to have a reflecting surface 31' formed on a portion of the reflective mirror 30' which is supported by the fixing bracket 100. So the reflective mirror 30' may be formed to have a reflecting surface 31' that extends 90 degrees or more in the left and right of a straight line parallel to the forward and backward directions of the robot cleaner 1. For example, the reflecting surface 31' may be formed so that each of β and β' of FIG. 10B is an angle of about 90 degrees to 120 degrees.

Referring to FIG. 5, the light emitting modules 71 and 72 are disposed at the front side of the main body 1a, and are formed to project a planar light toward the front area of the robot cleaner 1. The light emitting modules 71 and 72 may be disposed at least at one of the left side, right side, upper side, and bottom side of the lens assembly 20. Also, a plurality of light emitting modules may be disposed to detect obstacles which exist in the front area, the upper side of the front area, and the lower side of the front area. In this exemplary embodiment, the light emitting modules may include a lower light emitting module 71 that projects a planar light downward obliquely toward the front area to detect obstacles existing in both the front area and the lower side of the front area, and an upper light emitting module 72 that projects the planar light upward obliquely toward the front area to detect obstacles existing in the upper side of the front area.

Each of the light emitting modules 71 and 72 may include a light source 71-1 and 72-1 and a light source driving part 71-2 and 72-2 to drive the light source 71-1 and 72-1. The light source 71-1 and 72-1 emits light, and may include, for example, a laser diode (LD), a light emitting diode (LED), etc. The light may include infrared, visible light, etc. The light source driving part 71-2 and 72-2 operates the light source 71-1 and 72-1 depending on a light control signal of an obstacle detecting controller 70. Also, the light emitting modules 71 and 72 may include a light guide member that forms the light emitted from the light source 71-1 and 72-1 into a planar light in a fan shape. The light guide member may be formed using mirrors to reflect the incident light or lenses to refract the incident light. Alternatively, fan-shaped planar light may be formed by using a plurality of light sources.

The light emitted from the upper light emitting module 72 is reflected by an obstacle existing in the upper side of the front area, and then is incident on the catadioptric lens 40 of the lens assembly 20. The light emitted from the lower light emitting module 71 is reflected by an obstacle existing in the front area, and then is incident on the reflective mirror 30 of the lens assembly 20.

Because most of obstacles existing in the front area are located at the bottom surface on which the robot cleaner 1 moves such as on the floor, if the lower light emitting module 71 emits light toward the lower side of the front area, the light is reflected by the most of the obstacles, and then is incident on the reflective mirror 30 of the lens assembly 20. Accordingly, the obstacles which are located in the front area and at the lower side of the front area may be detected by the lower light emitting module 71 and the reflective mirror 30. On the other hand, because obstacles that are not disposed on the bottom surface may be disposed on a ceiling or a wall at a predetermined distance from the bottom surface, the light emitted toward the upper side of the front area by the upper light emitting module 72 is reflected by upper side obstacles, and then is incident on the catadioptric lens 40 of the lens assembly 20. Accordingly, the obstacles which are located above or at the upper side of the front area may be detected by the upper light emitting module 72 and the catadioptric lens 40.

The image forming module 50 may be formed to detect the obstacle from the reflected light of the obstacle in the front area that is reflected by the reflective mirror 30 and the reflected light of the obstacle in the upper side of the front area that is refracted by the catadioptric lens 40.

As illustrated in FIG. 5, the image forming module 50 may include a plurality of optical members 51 that change the optical path of the incident light and collect the incident light so that the light incident from the reflective mirror 30 and the catadioptric lens 40 forms an image in an image sensor 53, in which an image is formed by the collected incident light.

The plurality of optical members 51 cause the light incident from the reflective mirror 30 and the catadioptric lens 40 to form an image in the image sensor 53. The plurality of optical members 51 may be formed for example of a plurality of lens.

The image sensor 53 receives the light reflected by the obstacles, and generates analog signals or digital signals. For example, the image sensor 53 may include a complementary metal oxide semiconductor (CMOS) image sensor, a charge coupled device (CCD) image sensor, etc. capable of obtaining an image by the reflected light.

Figure 11A:
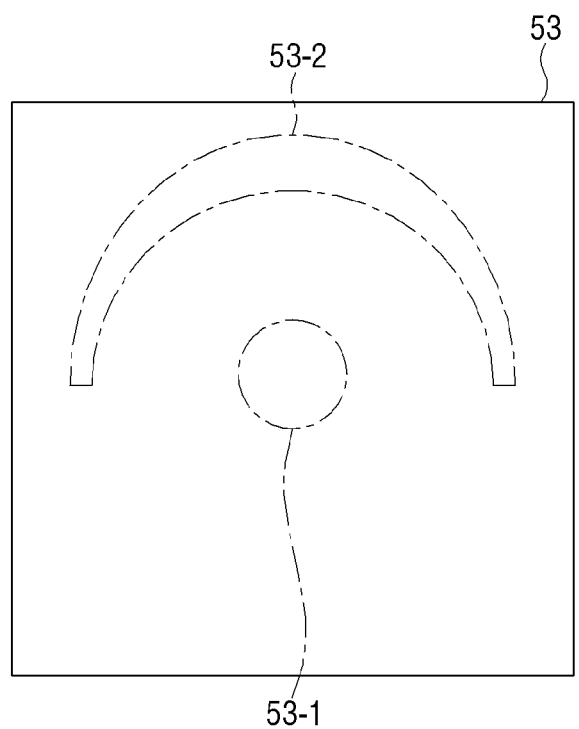
FIG. 11A is a view illustrating a first area and a second area of an image sensor of an obstacle detecting unit according to an exemplary embodiment of the present disclosure.

The image sensor 53, as illustrated in FIG. 11A, may include a first area 53-1 provided in a central portion thereof and a second area 53-2 provided in a form surrounding the first area 53-1 outside the first area 53-1. The light entering the catadioptric lens 40 is incident on the first area 53-1 of the image sensor 53, thereby forming an upper image. In other words, an image of an obstacle which is located in the upper side of the front area is formed in the first area 53-1 in the center of the image sensor 53. The light reflected by the reflective mirror 30 is incident on the second area 53-2 of the image sensor 53, thereby forming a lower image. In other words, an image of an obstacle which is located in the front area is formed in the second area 53-2 of the image sensor 53.

Figure 11B:
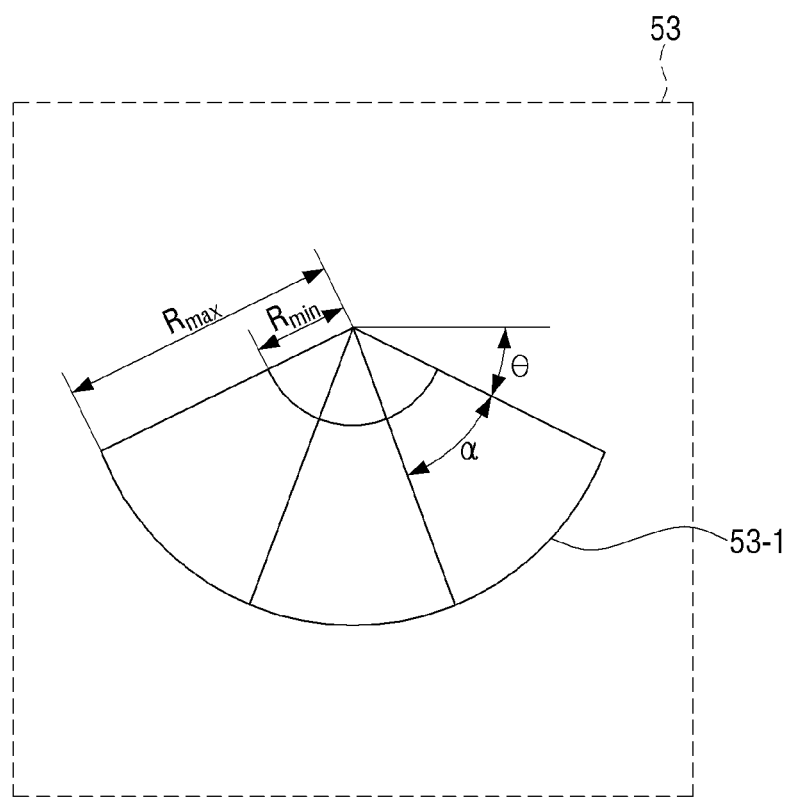
FIG. 11B is a view explaining a first area of an image sensor of an obstacle detecting unit according to an exemplary embodiment of the present disclosure.

FIG. 11B is a view illustrating an example of the first area 53-1 defined in the image sensor 53. Referring to FIG. 11B, the first area 53-1 in which the upper image is focused is formed in an approximately half-moon shape, and is an area which is defined by a first arc $R_{min}$ and a second arc $R_{max}$. The radiuses $R_{min}$ and $R_{max}$ of the first and second arcs and an angle of the arc may be appropriately adjusted. The first area 53-1 may be divided into three equal parts by a certain angle. The number of pixels of an image that is formed in the first area 53-1 is counted, and, if the number of pixels is more than a reference value, the image may be recognized as an obstacle. Also, the position of the obstacle may be determined in accordance with in which one of the three equal parts the image is located.

In the case of the first area 53-1 as illustrated in FIG. 11B, $\theta=25$ degrees, divided number (n)=3, $\alpha=(180°-2\times\theta)/n$, $R_{max}=20$ pixels, $R_{min}=5$ pixels, image reference value (threshold)=20. Accordingly, in the present embodiment, when the number of pixels of the image formed in the first area 53-1 is more than 20, the controller 90 may determine that an obstacle exists in the upper side of the front area in front of the robot cleaner 1.

The reflected light that is reflected back by the obstacle after being emitted from the light emitting modules 71 and 72 passes through the lens assembly 20 and the plurality of optical members 51 of the image forming module 50, and then is converted into an analog signal or a digital signal in the image sensor 53.

The signal process portion 55 may convert the analog signal received from the image sensor 53 into a digital signal, and may convert the format of the signal. The signal process portion 55 may include an A/D converter (not illustrated) for converting an analog signal into a digital signal. The signal process portion 55 may convert the format of the image obtained by the image sensor 53 according to the device as needed.

The obstacle detecting controller 70 may generate a light control signal for controlling an on/off of the light source 71-1 and 72-1, and may generate obstacle detection information on the basis of the image signal. For example, the obstacle detection information may include a distance between the main body 1a and an obstacle, a position of the obstacle, a height of the obstacle, a shape of the obstacle, a falling point, etc. The obstacle detecting controller 70 need not be a separate module that is physically connected to the light emitting modules 71 and 72 and the image forming module 50. If necessary, the controller 90, such as a CPU, a MPU, etc., provided in a device in which the obstacle detecting unit 10 is disposed, for example, the robot cleaner 1 may be used as the obstacle detecting controller 70.

Hereinafter, a description of how a robot cleaner provided with an obstacle detecting unit according to an exemplary embodiment of the present disclosure detects obstacles will be provided.

The robot cleaner 1 causes the upper light emitting module 72 and the lower light emitting module 71 to project light while moving in the cleaning area.

Figure 12A:
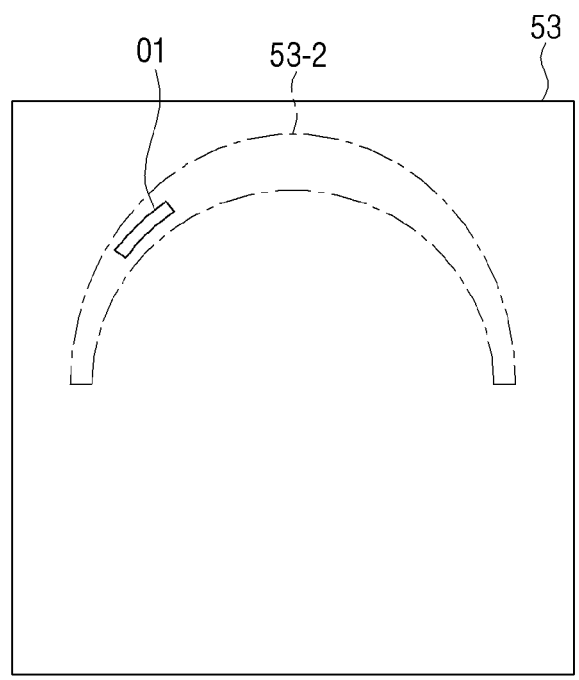
FIG. 12A is a view illustrating an image that is focused on the image sensor of FIG. 11A when there is a front obstacle.

If there is an obstacle on the bottom surface of the front area in front of the robot cleaner 1, the light emitted from the lower light emitting module 71 is reflected by the front obstacle. The reflected light reflected by the front obstacle, as illustrated in FIG. 7, is incident on the reflective mirror 30 of the lens assembly 20 of the obstacle detecting unit 10 disposed in the robot cleaner 1. The reflective mirror 30 reflects the light incident from the front area and the lower side of the front area to the image forming module 50. The light incident on the image forming module 50, as illustrated in FIG. 12A, forms an obstacle image O1 corresponding to the front obstacle in the second area 53-2 of the image sensor 53. The controller 90 may determine the presence and position of the obstacle on the basis of the obstacle image O1 obtained by the image sensor 53.

Figure 12B:
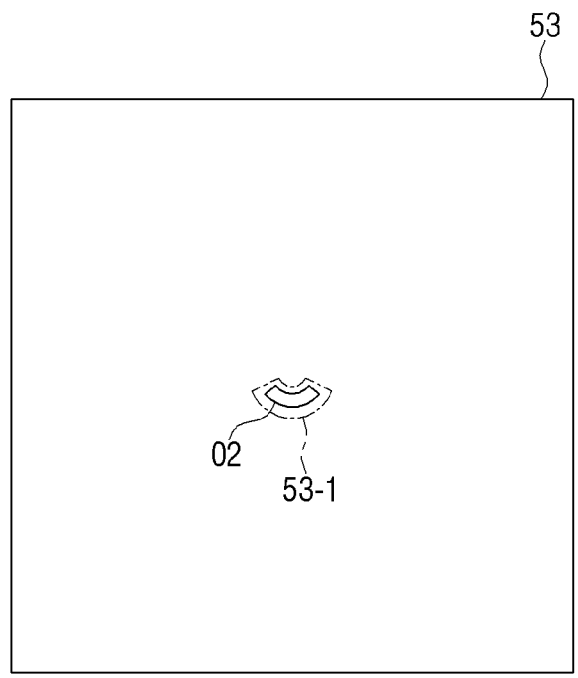
FIG. 12B is a view illustrating an image that is focused on the image sensor of FIG. 11A when there is an upper obstacle.

In addition, if there is an obstacle in the upper side of the front area in front of the robot cleaner 1, specifically, if the obstacle does not exist on the bottom surface of the cleaning area but an upper obstacle exists at a certain distance away from the bottom surface, the light emitted from the upper light emitting module 72 is reflected by the upper obstacle. However, the light emitted from the lower light emitting module 71 is not reflected by the upper obstacle. The reflected light reflected by the upper obstacle, as illustrated in FIG. 7, is incident on the refracting area 41 of the first surface of the catadioptric lens 40 of the lens assembly 20 of the obstacle detecting unit 10 disposed in the robot cleaner 1. The catadioptric lens 40 refracts the incident light to the image forming module 50. In detail, the light entering the refracting area 41 of the first surface of the catadioptric lens 40 is reflected by the reflecting area 43 of the second surface, and then is incident on the reflecting area 42 of the first surface. The reflecting area 42 of the first surface reflects the incident light to the refracting area 44 of the second surface. The refracting area 44 of the second surface refracts the incident light to the image forming module 50. The light incident on the image forming module 50, as illustrated in FIG. 12B, forms an obstacle image O2 corresponding to the upper obstacle in the first area 53-1 of the image sensor 53. The controller 90 may determine the presence and position of the upper obstacle on the basis of the obstacle image O2 obtained by the first area 53-1 of the image sensor 53.

Further, the obstacle detecting unit 10 according to an exemplary embodiment of the present disclosure may be formed to recognize only upper obstacles which are located in a predetermined height or less from the bottom surface as obstacles. This will be described with reference to FIGS. 13A and 13B.

Figure 13A:
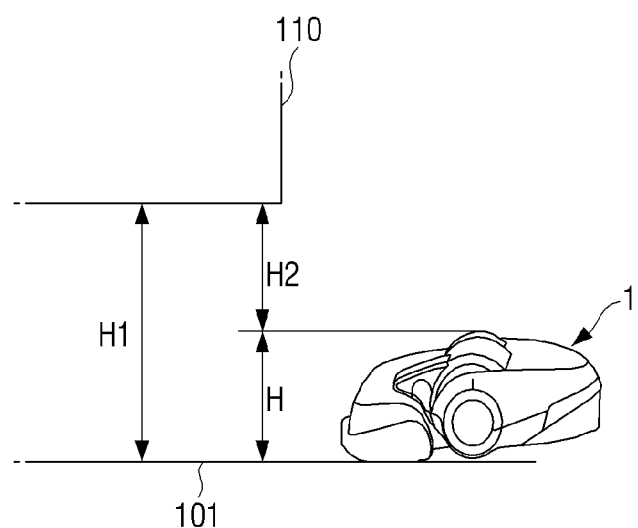
FIG. 13A is a view illustrating relationship between a robot cleaner and an upper obstacle.
Figure 13B:
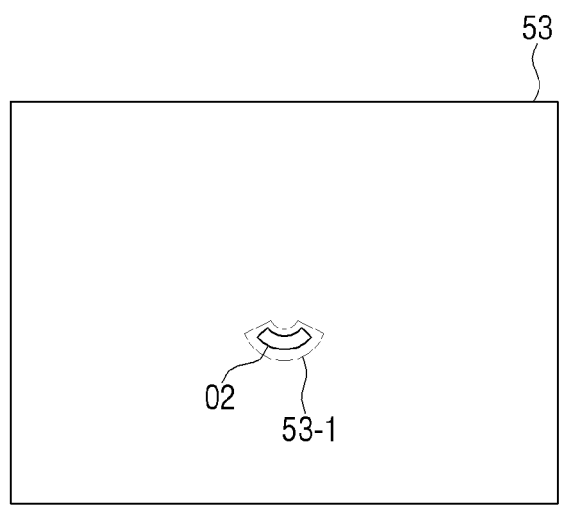
FIG. 13B is a view illustrating a state in which, when a robot cleaner detects an upper obstacle, an image of the obstacle is focused in a first area of an image sensor of an obstacle detecting unit.
Figure 13C:
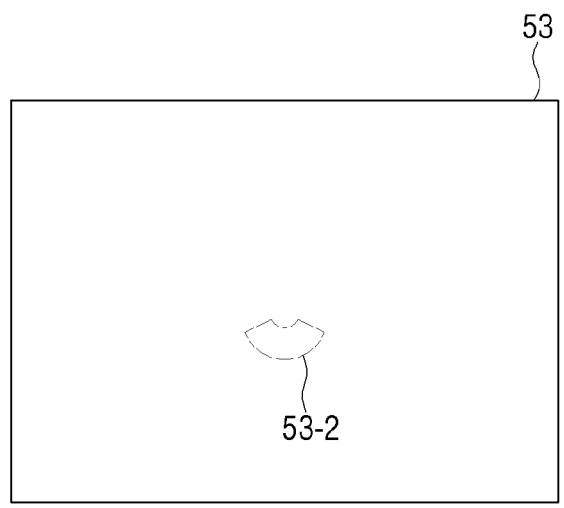
FIG. 13C is a view illustrating, when a robot cleaner does not detect an upper obstacle, a first area of an image sensor of an obstacle detecting unit.

FIG. 13A is a view illustrating relationship between a robot cleaner and an upper obstacle. FIG. 13B is a view illustrating a state in which, when a robot cleaner detects an upper obstacle, an image of the obstacle is focused in a first area of an image sensor of an obstacle detecting unit, and FIG. 13C is a view illustrating a first area of an image sensor of an obstacle detecting unit when a robot cleaner does not detect an upper obstacle.

If a distance H1 between the bottom surface 101, e.g., a floor or surface to be cleaned, and the upper obstacle 110 is larger than the height H of the robot cleaner 1, the robot cleaner 1 can enter below the upper obstacle 110 so that the robot cleaner 1 can also clean the area below the upper obstacle 110. Accordingly, the obstacle detecting unit 10 according to an exemplary embodiment of the present disclosure may not be formed to recognize an obstacle 110, such as a thing, object, facilities, etc. that are located at a distance greater than the height H of the robot cleaner 1 away from the bottom surface 101 of the cleaning area as the obstacle. However, the obstacle detecting unit 10 may be formed to recognize things that are located at a distance smaller than the height H of the robot cleaner 1 away from the bottom surface 101 as the upper obstacles. For example, if the height H of the robot cleaner 1 is 15 cm, the obstacle detecting unit 10 may not recognize a thing that is located at a distance more than 16 cm away from the bottom surface 101 as the upper obstacle, but recognize those which are located at a distance less than 16 cm away from the bottom surface 101 as the upper obstacle.

Alternatively, the height H1 of the obstacle may be determined based on a distance H2 to the obstacle from the lens assembly 20 disposed in the robot cleaner 1 not from the bottom surface 101 of the cleaning area. For example, if the height H' from lens assembly 20 to the highest point of the robot cleaner 1 is about 8 cm, the obstacle detecting unit 10 may recognize an object that is approximately 9 cm away from the lens assembly 20, namely, H2=9 cm as the upper obstacle, but may not recognize an object that is approximately 12 cm away from the lens assembly 20, namely, H2=12 cm as the upper obstacle.

FIG. 13B illustrates a state in which the image sensor 53 of the obstacle detecting unit 10 detects the upper object 110 when the upper object 110 is about 9 cm away from the lens assembly 20. Accordingly, as illustrated in FIG. 13B, an obstacle image O2 is formed in the first area 53-1 of the image sensor 53. FIG. 13C illustrates a state in which the image sensor 53 of the obstacle detecting unit 10 does not detect the upper object 110 when the upper object 110 is about 12 cm away from the lens assembly 20. Accordingly, as illustrated in FIG. 13C, no image appears in the first area 53-1 of the image sensor 53.

The distance H1 from the bottom surface 101 to the upper object 110 existing in the upper side of the front area in front of the robot cleaner 1 which the obstacle detecting unit 10 can recognize as an obstacle may be determined by adjusting the refracting area 41 of the first surface of the catadioptric lens 40 on which the reflected light reflected by the upper object 110 is incident.

Also, when detecting the upper obstacle by the catadioptric lens 40, a detection height of an object (referred to as a front upper object) which is located in the upper side of the front area in direct front of the robot cleaner 1 in the moving direction F of the robot cleaner 1 is different from the detection height of an object (referred to as a side upper object) which is located at a side of the upper side of the front area in the moving direction F of the robot cleaner 1 due to the lens characteristics. Even if the side upper object is higher than the front upper object, the obstacle detecting unit 10 may recognize the side upper object which is located at the side of the front upper object as an obstacle. Accordingly, if there are two objects (a front upper object and a side upper object) at the same height in the moving direction F of the robot cleaner 1, the robot cleaner 1 may recognize the side upper object as an obstacle, even if the robot cleaner 1 does not recognize the front upper object as an obstacle. Accordingly, the robot cleaner 1 may mistakenly determine an area which the robot cleaner 1 can in fact enter as an area which the robot cleaner 1 cannot enter. In order to prevent this, it is necessary to block some of the light which is reflected by the side upper object in front of the robot cleaner 1 and is incident on the catadioptric lens 40. The light incident on the catadioptric lens 40 may be adjusted by masking the refracting area 41 of the first surface of the catadioptric lens 40. The shape of the masking area may be determined based on whether the upper light emitting module 72 is disposed in the upper side or the lower side with respect to the lens assembly 20.

Figure 14A:
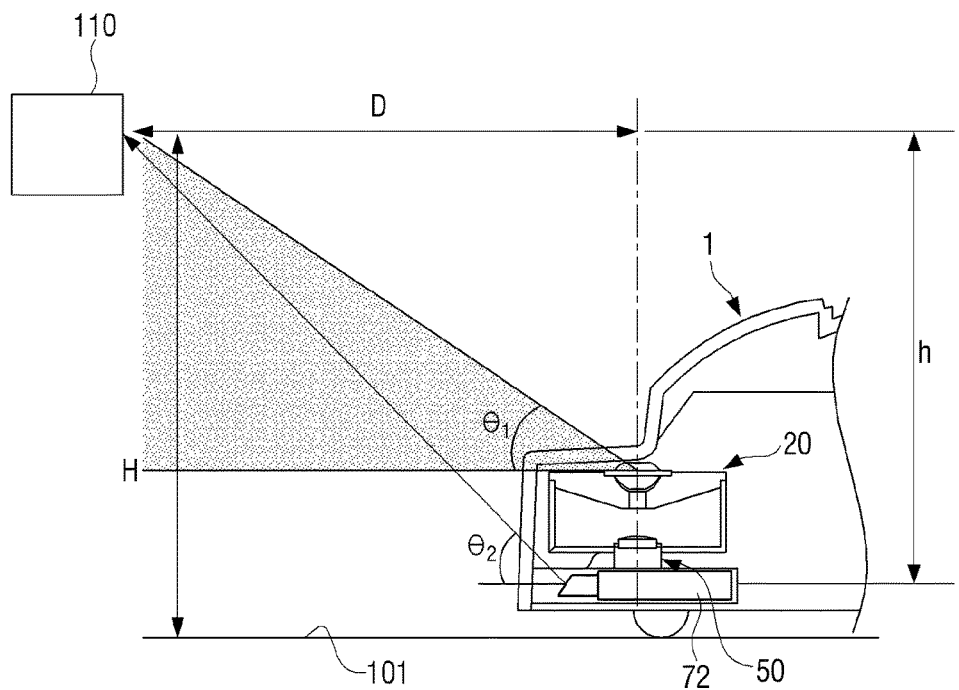
FIG. 14A is a view illustrating relationship between an upper obstacle and an obstacle detecting unit when an upper light emitting module is located below a lens assembly of the obstacle detecting unit.
Figure 14B:
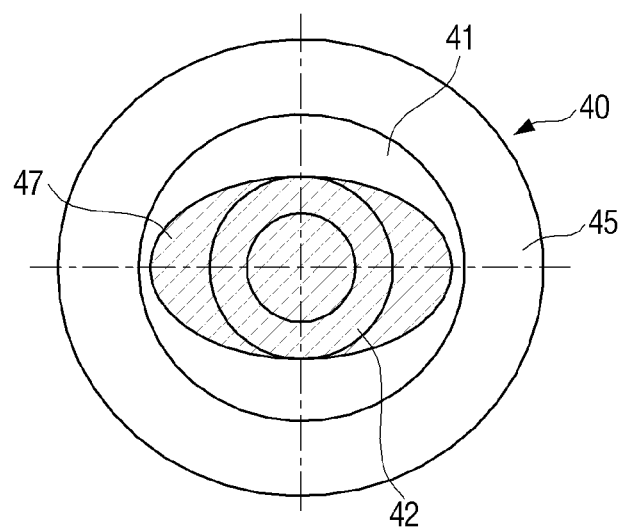
FIG. 14B is a view illustrating a masking area formed on a catadioptric lens of the lens assembly in the case of FIG. 14A.

FIG. 14A is a view illustrating a case in which the upper obstacle is detected when an upper light emitting module is located below a lens assembly, and FIG. 14B is a view illustrating a shape of a masking area formed on a catadioptric lens of the lens assembly in the case of FIG. 14A.

Referring to FIG. 14A, the upper light emitting module 72 is disposed below the lens assembly 20, and projects a planar light toward the upper side of the front area. In this case, the masking area formed on the first surface of the catadioptric lens 40, as illustrated in FIG. 14B, is a substantially oval that covers some of the refracting area 41 and the reflecting area 42 of the first surface. The viewing angle θ1 of the catadioptric lens 40 may be approximately 0~40 degrees. At this time, the height H of the robot cleaner 1 is about 145 mm, the obstacle detecting distance D is about 100 mm, the installation height of the upper light emitting module 72 is about 60 mm, and an angle θ2 with which the upper light emitting module 72 projects a planar light is about 52 degrees.

Figure 15A:
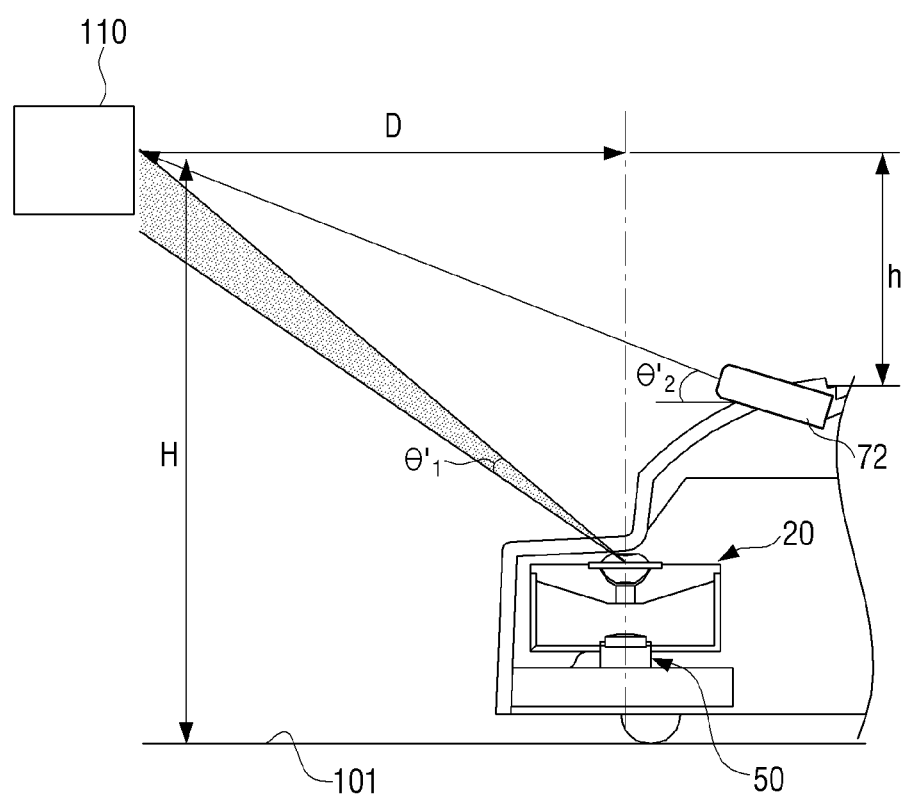
FIG. 15A is a view illustrating relationship between an upper obstacle and an obstacle detecting unit when an upper light emitting module is located above a lens assembly of the obstacle detecting unit.
Figure 15B:
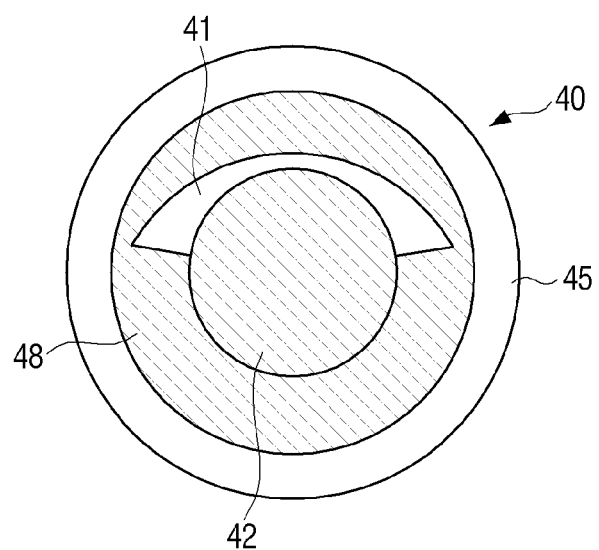
FIG. 15B is a view illustrating a masking area formed on a catadioptric lens of the lens assembly in the case of FIG. 15A.

FIG. 15A is a view illustrating a case in which the upper obstacle is detected when an upper light emitting module is located above a lens assembly, and FIG. 15B is a view illustrating a shape of a masking area formed on a catadioptric lens of the lens assembly in the case of FIG. 15A.

Referring to FIG. 15A, the upper light emitting module 72 is disposed above the lens assembly 20, and projects a planar light toward the upper side of the front area. In this case, the masking area formed on the first surface of the catadioptric lens 40, as illustrated in FIG. 15B, has a shape in which a region 41 in which the light is incident is left in a shape of a substantially crescent and the rest region is formed to block the light from entering. The viewing angle θ1' of the catadioptric lens 40 may be approximately 33~44 degrees. At this time, the height H of the robot cleaner 1 is about 145 mm, the obstacle detecting distance D is about 100 mm, the installation height of the upper light emitting module 72 is about 87.2 mm, and an angle θ2' with which the upper light emitting module 72 projects a planar light is about 15 degrees.

If the masking area 47 and 48 is formed on the first surface 41 and 42 of the catadioptric lens 40 in this way, the detection height in which the obstacle detecting unit 10 can detect the upper obstacle 110 may be the same in the direct front of the robot cleaner 1 and in the side of the direct front.

In the above description, the obstacle detecting unit 10 projects a planar light in the forward direction by using the light emitting module, and then recognizes an object which reflects the projected light as an obstacle. However, the present disclosure is not limited thereto. As another exemplary embodiment, without projecting the planar light using the light emitting module, the obstacle detecting unit may be formed to process a peripheral image formed in the image sensor of the image forming module by the external light, thereby detecting the presence and status of obstacles which are located in front of the robot cleaner. Conventional image processing methods may be used to detect obstacles from the peripheral image of the robot cleaner formed in the image sensor. In the method of using the light emitting module, the detection range may be defined so that a certain area for moving of the robot cleaner is detected and the other area which is not associated with the moving of the robot cleaner is not detected.

With a mobile robot provided with an obstacle detecting unit according to an exemplary embodiment of the present disclosure as described above, obstacles which are in the front area, the lower side of the front area, and the upper side of the front area in front of the mobile robot can be detected using an obstacle detecting unit including a single lens assembly and an image forming module. Therefore, the manufacturing cost may be reduced compared with conventional mobile robots using separate apparatuses for detecting obstacles which are located in the front area and obstacles which are located in the upper side of the front area.

Also, whit an obstacle detecting unit according to an exemplary embodiment of the present disclosure, because the catadioptric lens and the reflective mirror constituting the lens assembly are detachably disposed, the specifications of the catadioptric lens and reflective mirror may be changed separately if necessary. Therefore, adaptability to the mobile robot is good.

Further, with an obstacle detecting unit according to an exemplary embodiment of the present disclosure, because the catadioptric lens, the reflective mirror, and the image forming module are disposed on the same axis, an obstacle detection error may be reduced compared with the conventional obstacle detecting unit in which the reflective mirror and the image forming module are not disposed on the same axis.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A lens assembly mountable in an obstacle detection device comprising:
   a reflective mirror formed to reflect light that is incident from at least a portion of an area in front of the obstacle detection device and from at least a portion of a lower portion of the area in front of the obstacle detection device toward below a central portion of the reflective mirror and including a through hole formed in the central portion of the reflective mirror; and
   a catadioptric lens to direct light, which is incident from at least a portion of the area in front of the obstacle detection device and from at least a portion of an upper portion of the area in front of the obstacle detection device, to pass through the through hole of the reflective mirror, the catadioptric lens being disposed coaxially with the reflective mirror in an upper portion of the reflective mirror.

2. The lens assembly of claim 1, wherein the catadioptric lens is detachably disposed in the reflective mirror.

3. The lens assembly of claim 1, wherein the catadioptric lens comprises:
   a first surface including a reflecting area formed on an inside of the first surface and a refracting area surrounding the reflecting area formed on the inside of the first surface, and
   a second surface facing the first surface and including a refracting area and a reflecting area surrounding the refracting area of the second surface.

4. The lens assembly of claim 3, wherein
   the refracting area of the first surface of the catadioptric lens is formed to receive outside light,
   the reflecting area of the second surface of the catadioptric lens is formed to reflect the light incident on the refracting area of the first surface to the reflecting area of the first surface, and
   the refracting area of the second surface is formed to transmit the light reflected by the reflecting area of the first surface so that the light is emitted to an outside of the catadioptric lens.

5. The lens assembly of claim 3, wherein
   the refracting area of the first surface is formed so that light having an incident angle of between 0 and 60 degrees is incident.

6. The lens assembly of claim 5, wherein
   a masking area to limit the incident angle is formed on the first surface.

7. The lens assembly of claim 3, wherein
   the reflecting area of the first surface and the reflecting area of the second surface are formed of any one of aluminum and chrome.

8. The lens assembly of claim 1, wherein
   the reflective mirror is formed to reflect light having an incident angle of between −60 and 0 degrees below the through hole of the reflective mirror.

9. The lens assembly of claim 1, wherein
   the through hole of the reflective mirror is formed to not interfere with the light emitted from the catadioptric lens.

* * * * *